United States Patent Office 2,983,976
Patented May 16, 1961

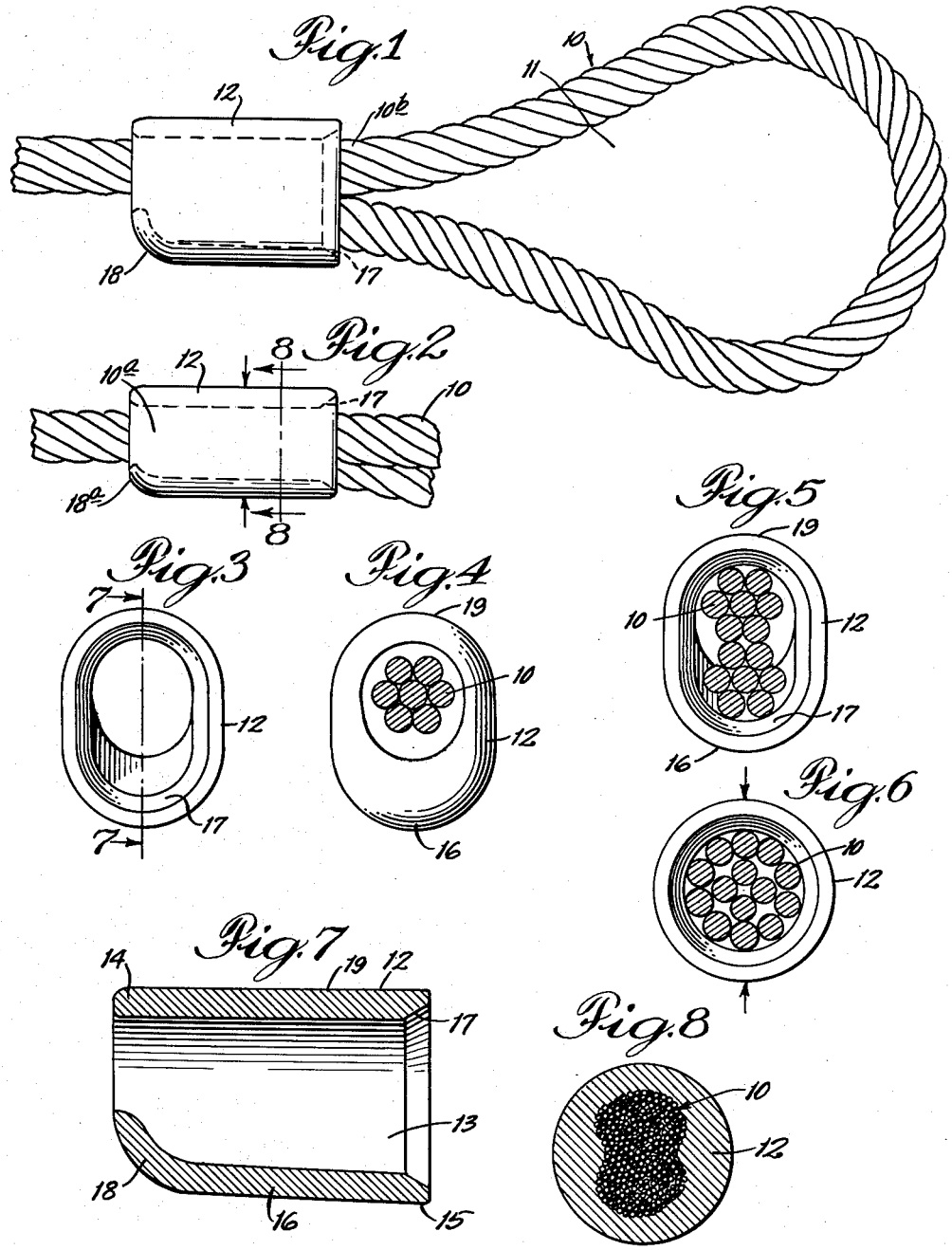

2,983,976
DUPLEX SLEEVE STRUCTURE

Leslie G. Ehmann, Portland, Oreg., assignor to Esco Corporation, a corporation of Oregon Filed June 20, 1957, Ser. No. 666,941

4 Claims. (Cl. 24—123)

This invention relates to a duplex sleeve structure which has particular application in securing wire rope on itself to form an eye splice.

This application is a continuation-in-part of my copending application Serial No. 564,447, filed February 9, 1956, and now Patent No. 2,895,195.

In the eye splice which is achievable by my invention, one end of a wire rope is laid parallel to the main portion of the rope. A short length of the main portion of the rope and the end of the rope are confined in a sleeve, generally of oblong cross section. The free end of the rope is then secured in place within the sleeve and contiguous to the main portion of the rope by deforming the sleeve as by swaging. By selecting the points at which the end of the rope is brought into contiguous relation with the main portion of the rope, an eye or loop of any desired size can be produced.

The previously used duplex sleeve structures have generally assumed a configuration wherein the passageway extending through the sleeve was of oblong cross section and extended uniformly throughout the length of the sleeve.

A difficult problem has arisen in the use of the heretofore available duplex sleeves. These problems arise during swaging and persist through the use of a wire rope secured with a duplex sleeve. These difficulties and problems arise from the non-uniform distribution of strains in the sleeve joint. An important factor in producing non-uniform strains is the swaging operation where only a part of the sleeve envelopes two thicknesses of wire rope. Where the end of the wire rope is inserted all the way through a duplex sleeve to avoid this problem, a dangerous end is presented in the area wherever the eye splice is used. Therefore, it is a general practice to insert the end of the rope only partway into the sleeve.

The swaging operation on heretofore available sleeves in changing an oblong cross section to a circular one produces a "kink" in the wire rope. One end of the sleeve carries two thicknesses of rope, the other only one thickness. Since, after swaging, the openings at both ends of the sleeve are of the same size and generally coaxially disposed to each other, a definite offset or "kink" is introduced in the length of rope that extends through the sleeve. Continual stress is applied in the region of the "kink" which often produces rope failure.

It is an object of my invention to provide a new form of duplex sleeve. Another object is to provide a duplex sleeve that overcomes the problems and disadvantages present in the heretofore available duplex sleeves. Another object of my invention is that of providing an eye splice for a wire rope in which the sleeve furnishes the splice anchorage by being secured in position through a swaging operation. Another object is to provide a duplex sleeve equipped with an integral end wall that partially closes the opening at one end of the sleeve. Other objects and advantages of my invention can be seen as this specification proceeds.

My invention will be explained in conjunction with the attached drawing, in which—

Figure 1 is an elevational view of an eye assembly embodying the invention but before the duplex sleeve has been swaged; Fig. 2 is a fragmentary elevational view similar to Fig. 1 but showing the duplex sleeve structure after swaging; Fig. 3 is an end view of the duplex sleeve structure of my invention; Fig. 4 is a view similar to Fig. 3 but showing the opposite end of my invention; Fig. 5 is a view similar to Fig. 3 but in addition showing stranded cables mounted in the duplex sleeve; Fig. 6 is a view similar to Fig. 5 but after the duplex sleeve structure has been swaged; Fig. 7 is a cross-sectional view taken along the line 7—7 of Fig. 3 and Fig. 8 is a cross-sectional view through a swaged portion of the sleeve.

Referring now to the drawing, the numeral 10 generally indicates a stranded wire rope. Rope 10 has been doubled on itself to form an eye 11. One part of the main portion of rope 10 and an end thereof are located within sleeve 12. In the forming of loop 11, the end portion of the rope may be reversed in direction and brought into adjacent relation with a particular area of the rope spaced from the end thereof by a distance that will provide a loop of the desired size. In Fig. 1, the sleeve 12 is shown prior to its swaging operation wherein it will be compressed to anchor the adjacent rope areas together.

To obtain the completed loop secured in place by a sleeve that has been deformed and as shown in Fig. 2, the sleeve is mounted on the rope as shown in Fig. 4. The end of rope 10 is then brought back and inserted into the sleeve, as shown in Fig. 5. Thereafter radially compressive forces are exerted upon sleeve 12 as shown in Figs. 2 and 6 to bring the shape of the sleeve into a circular cross-sectional form.

The sleeve 12 itself can be seen most clearly in Fig. 7. Referring now to Fig. 7, it is seen that sleeve 12 is provided with an opening or bore 13 that extends longitudinally therethrough. The bore or opening 13 has a reduced end portion 14 and an enlarged end portion 15. Bore 13 is generally of an oblong cross section, as can be appreciated from a consideration of Fig. 3. One form of the oblong configuration of bore referred to has the shape of the closed curve formed by following intersecting equal circles and the mutual tangents to the circles.

Bore 13 becomes smaller in its major dimension in proceeding from end portion 15 to end portion 14, the tapered wall portion of sleeve 12 that provides such reduction being indicated by the numeral 16 in Fig. 7. When the end of rope 10 is inserted into end portion 15, the tapered longitudinal configuration of sleeve 12 directs the end of rope 10 into proper position within sleeve 12.

The end of bore 13 adjacent end portion 15 is provided with an outer taper or flare 17. Taper 17 is in the nature of flaring and serves to facilitate rope insertion and to minimize wear on rope 10 where rope 10 comes into engagement with sleeve 12. Taper 17 is the area that would provide considerable wear of rope 10. As can be appreciated from Fig. 1, the portions of rope 10 outward of taper 17 are not confined, while those inward of taper 17 are tightly confined by the swaged sleeve. By spreading the compressive forces exerted against the portion of rope 10 entering end portion 15, a much greater rope life is made available.

The end portion 14 of sleeve 12 is provided with a transversely disposed wall portion designated 18. Wall portion 18, in cooperation with the rest of sleeve 12, provides a smaller opening at end 14 than at end 15, as can be appreciated from a consideration of Figs. 4 and 5. The opening at end portion 14 is slightly elliptical. Wall portion 18 is tapered and lies in that portion of the sleeve having the greatest curvature. The provision of wall portion or shoulder 18 results in offsetting the center of the opening in end 14 from the center of the opening in end portion 15. Thus, in swaging sleeve 12, no undesirable distortion or "kinking" of the end of rope 10 in end portion 14 is produced, thereby obviating the disadvantages of the prior art sleeves.

Exceptionally satisfactory results have been obtained in forming splices in wire rope where my duplex sleeve is provided with a sharp taper (as at 18). Substantially all "kinking" is eliminated in the main length of rope which would otherwise be present in the region designated 10a. By eliminating such "kinking" or abrupt shoulders in the splices achieved through duplex sleeves, I substantially lengthen the life of a splice and minimize the dangers of failure.

It is also to be noted that a portion of the taper in wall 18 is retained after swaging as shown in Fig. 2 and designated 18a. This facilitates the ease with which the sleeve can slip through timber or brush without accidentally engaging obstructions.

After swaging, the sleeve of my invention is characterized by substantially less internal void space than previously used sleeves, since wall 18 is deformed into this normally occurring void space. This further contributes to minimizing stress in region 10a of rope 10.

Wall 18 allows the sleeve to be pressed in an open channel die and only one application of pressure is necessary to swage the sleeve tightly in place on a wire rope.

The main section 10b of the rope 10 lies straight through the sleeve and is not subject to the distortion occurring in previously used sleeves. The side wall 19 of sleeve 12 opposite inclined wall 16 provides a straight surface for maintaining the main section of rope in a straight position. Thus, prior to swaging, the main section of rope 10b is supported substantially throughout sleeve 12 and in a straight line.

The hole at end 14 is provided slightly larger than the diameter of the rope intended to extend through it. This makes it possible to visually determine that the end of the rope is completely within the sleeve and not only partially entered. Also providing a slightly larger opening than the size of the rope prevents any cutting action on the main section 10b of the rope 10 when the sleeve 12 is pressed into place.

Excellent results have been obtained in preparing sleeves of the character described herein when a work hardenable metal is employed as the material of construction of the sleeve. For example, austenitic grades of steel will be hardened upon the deformation accompanying swaging with an attendant improvement in tensile strength. Compared to this, a conventional material of construction for sleeves, mild steel, undergoes a decided weakening during swaging wherein the tensile strength might be reduced from 40,000 pounds per square inch to as low as 15,000 pounds per square inch. Thus, conventionally employed sleeves are often subject to cracking and associated types of failure.

While in the foregoing specification an embodiment of the invention has been described in considerable detail for the purpose of adequately disclosing the invention, it will be appreciated that those skilled in the art may vary such details considerably without departing from the spirit and principles of the invention.

I claim:
1. A duplex sleeve adapted to secure two lengths of wire rope for the formation of an eye-splice, or the like, which prior to deformation to secure said lengths comprises an elongated hollow tubular body having an oblong cross section, there being a longitudinally-extending passage in said body defined by interior wall portions adapted to receive only two thicknesses of wire rope in side-by-side relation, said passage having an oblong cross section concentric with the body cross section and extending partway through said body from one end thereof, and tapered integral wall means on one side of said passage partially closing the other end of said body to provide an opening in said other end having its central portion laterally offset from the longitudinal centroidal axis of said body, the central portion of the opening in said one end being on said longitudindal axis, the longitudinal wall portion of said passage opposite said wall means being substantially straight and adapted to receive and support a length of wire rope in straight condition.

2. A duplex sleeve adapted to be swaged on a wire rope for securing an end part of a rope to a standing part thereof, comprising a deformable tubular body having an open oblong bore extending longitudinally from one end of the body to the other end to define openings at each end of said body and to receive said standing part along one narrow side of said bore and said end part along the other narrow side with said end part and standing part in straight side-by-side relation in said bore, said one narrow side of the bore being straight throughout its length and said other narrow side of the bore terminating near said other end of the body in an end wall portion extending generally transversely partway across said bore toward said one straight side, said standing part of the rope when secured in said body extending from said one straight side of the bore to said end wall portion, the opening at said other end having its central portion offset from the longitudinal centroidal axis of the body, the central portion of the opening in said one end being on said longitudinal axis.

3. A duplex sleeve adapted to secure two lengths of wire rope for the formation of an eye-splice, or the like, which prior to deformation to secure said lengths comprises an elongated hollow tubular body having an oblong cross section, there being a longitudinally-extending passage in said body defined by interior wall portions adapted to receive only two thicknesses of wire rope in side-by-side relation, said passage having an oblong cross section concentric with the body cross section and extending partway through said body from one end thereof, and tapered integral wall means on one side of said passage partially closing the other end of said body to provide an opening in said other end having its central portion laterally offset from the longitudinal centroidal axis of said body, the central portion of the opening in said one end being on said longitudinal axis, both openings lying in planes generally normal to said longitudinal axis, the longitudinal wall portion of said passage opposite said wall means being substantially straight and adapted to receive and support a length of wire rope in substantially straight condition.

4. A duplex sleeve adapted to be swaged on a wire rope for securing an end part of a rope to a standing part thereof, comprising a deformable tubular body having prior to deformation an open oblong bore of diminishing major axis extending longitudinally from one end of the body to the other end to define openings at each end of said body and to receive said standing part along one narrow side of said bore and said end part along the other narrow side with said end part and standing part in straight, side-by-side relation in said bore, said one narrow side of the bore being straight throughout its length and the other narrow side of the bore terminating near said other end of the body in an end wall portion extending generally transversely partway across said bore toward said one straight side, said standing part of the rope, when secured in said body, extending from said one straight side of the bore to said end wall portion, both openings lying in planes generally normal to the length of the bore, the center of the major axis in the plane of the opening at said other end being offset in a direction normal to the length of the bore from the center of the major axis in the plane of the opening at said one end.

References Cited in the file of this patent

UNITED STATES PATENTS

| | | |
|---|---|---|
| 2,327,683 | Warner | June 4, 1942 |
| 2,346,412 | Bratz | Apr. 11, 1944 |
| 2,881,496 | Wernsing | Apr. 14, 1959 |

FOREIGN PATENTS

| | | |
|---|---|---|
| 177,330 | Switzerland | Aug. 1, 1935 |
| 525,171 | Canada | May 15, 1956 |
| 711,779 | Germany | Oct. 6, 1941 |

OTHER REFERENCES

Gilmore: Abstract, Official Gazette, vol. 642, page 332, 687, 272, Jan. 2, 1951.